UNITED STATES PATENT OFFICE.

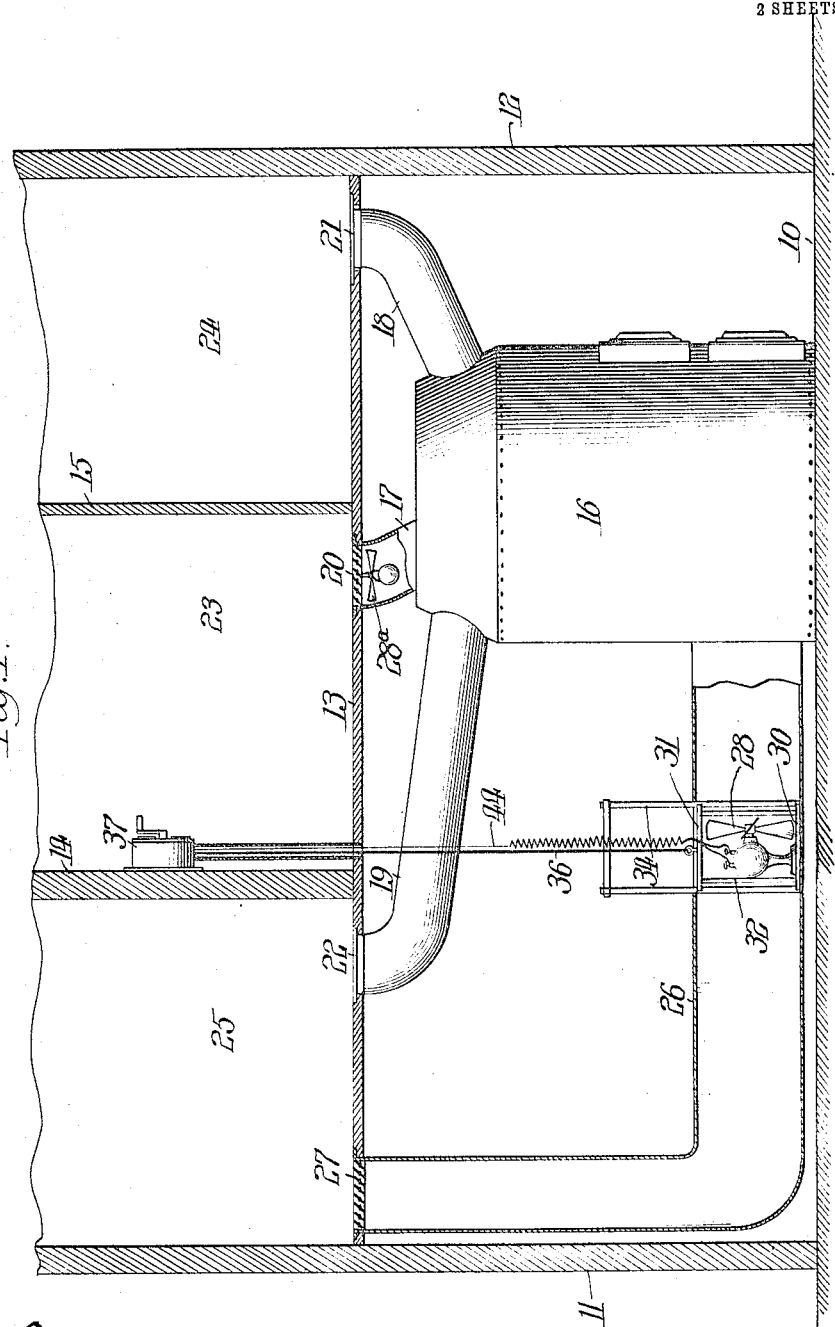

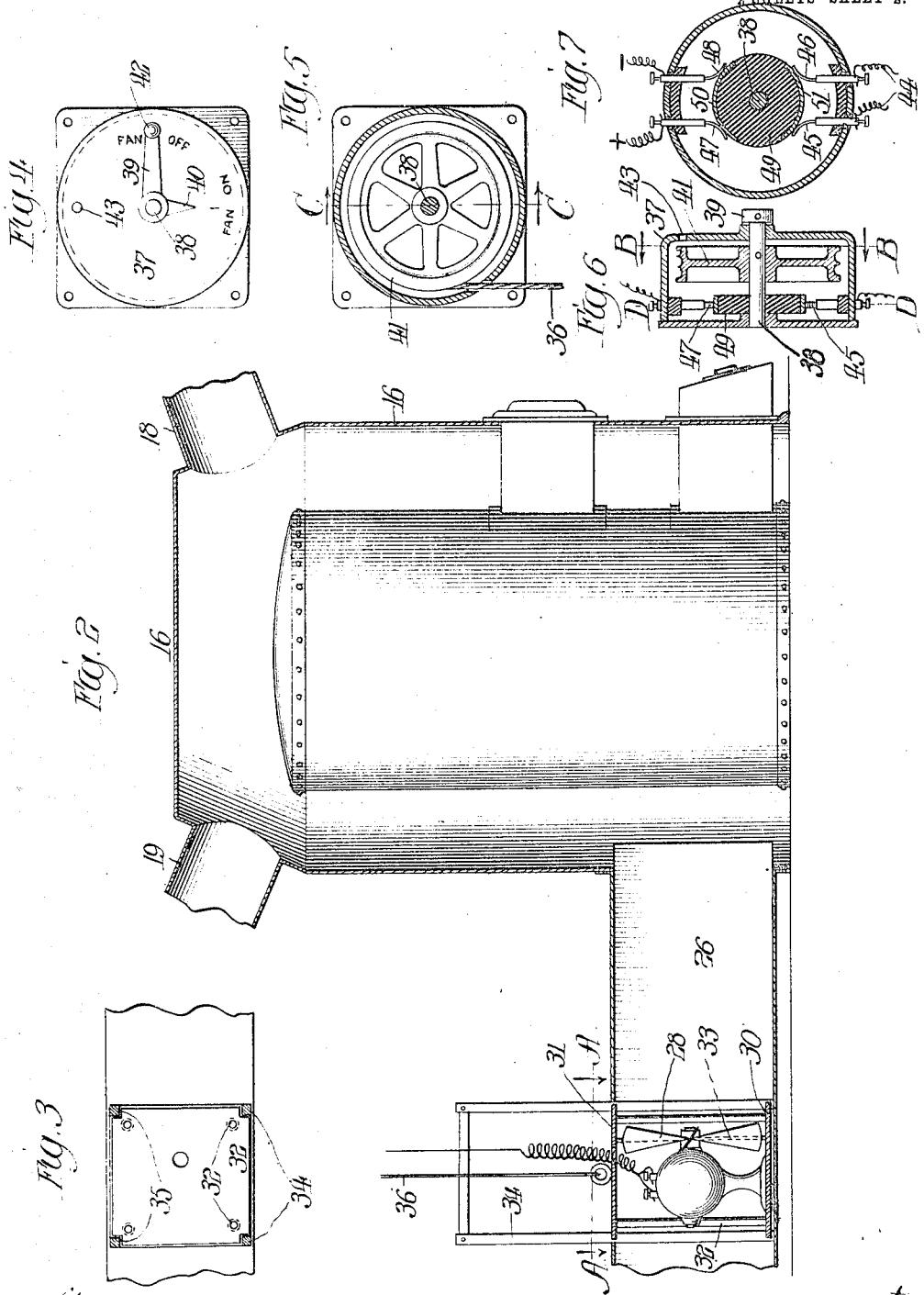

THOMAS E. HUNT, OF BLUE ISLAND, ILLINOIS, ASSIGNOR TO QUAKER MANUFACTURING COMPANY, OF CHICAGO, ILLINOIS, A CORPORATION OF ILLINOIS.

HOT-AIR-FURNACE HEATING SYSTEM.

No. 926,332. Specification of Letters Patent. Patented June 29, 1909.

Application filed February 18, 1907. Serial No. 357,838.

*To all whom it may concern:*

Be it known that I, THOMAS E. HUNT, a citizen of the United States, and resident of Blue Island, in the county of Cook and State of Illinois, have invented certain new and useful Improvements in Hot-Air-Furnace Heating Systems, of which the following is a full, clear, and exact specification.

My invention is concerned with improvements in hot-air furnace heating-systems, and is designed to produce a system of the class described which shall be capable of successful operation under all conditions of wind and weather, and which shall be capable of heating up a building more quickly than has been possible heretofore with such systems, and with a less expenditure of fuel. As is well known, in such systems prior to my invention, the natural draft resulting from the different specific gravity of hot and cold air has been depended upon to introduce the cold air into the casing of the furnace and to carry the heated air therefrom into rooms above the furnace. In case of a strong wind blowing across the cold-air inlet, it was a not infrequent occurrence for the current of air through the apparatus to be reversed and the hot air drawn out of doors, thus making the successful operation of the apparatus impossible. To remedy this difficulty, I supply means for producing a forced draft, preferably an electric fan located in the cold-air inlet pipe, so that the cold air will be positively drawn into the furnace casing and forced to the rooms to be heated, even if they be below the level of the furnace. I also preferably arrange the fan so that it can be readily withdrawn from the inlet pipe without destroying the continuity of the latter, so that when the house is once thoroughly heated and no adverse wind conditions exist, the fan may be removed, leaving the system unobstructed thereby, and capable of operating freely under natural draft conditions.

To illustrate my invention, I annex hereto two sheets of drawings, in which the same reference characters are used to designate identical parts in all the figures, of which,—

Figure 1 is a somewhat diagrammatic view illustrating a section through the lower part of a building employing the system of my invention; Fig. 2 is a similar view of a portion of the same system, but on a larger scale, and with the furnace casing in section; Fig. 3 is a detail in section on the line A—A of Fig. 2; Fig. 4 is a front elevation of the means for controlling the operation of the fan; Fig. 5 is a sectional view of the same apparatus, on the line B—B of Fig. 6; Fig. 6 is a vertical section on the line C—C of Fig. 5; and Fig. 7 is a sectional view on the line D—D of Fig. 6.

In Fig. 1, the floor of the basement is represented at 10, the outer walls at 11 and 12, the first floor at 13, and the partition walls at 14 and 15. The furnace casing is shown at 16, with the pipes 17, 18 and 19 leading to the hot-air registers 20, 21 and 22 of the rooms 23 and 24 and the hallway 25. The cold-air inlet pipe is represented at 26, and is provided with the inlet preferably opening in the hallway 25, which is adapted to be closed by a register valve 27. At a suitable point in the system, preferably at the point shown in the inlet passage, I locate means for producing a forced circulation of air through the system, which means preferably takes the form of a mechanical blower, such as the fan operated by an electric motor, indicated at 28. It will be perfectly apparent that, with the arrangement here shown, the cold air can be drawn from the inlet 27 and forced through the furnace casing and out through the pipes 17, 18 or 19, and thus the heated air may be caused to circulate through the dwelling much more rapidly than is possible when depending upon the natural draft. Of course the cold air inlet may open out of doors if desired, or it may open both out of and indoors and by means of valves in both inlets, the supply of cold air may be drawn wholly from either source or partly from both, as may be preferred. Once the temperature is raised to the desired point, the fan can be shut off and the natural circulation depended upon. I preferably, however, provide means for removing the fan 28 from the air-inlet passage in order that it may be unobstructed, so as to operate under natural draft conditions. For this purpose, I employ the mechanism best shown in Figs. 2 to 7, where it will be seen that the fan 28 is mounted in a framework composed of the base 30, which, when the fan is in use, rests upon the bottom of the inlet pipe 26, and the top piece 31, which, when the fan is in place, forms a portion of the top of the inlet-pipe 26. The base 30 and the top piece 31 are connected in some suitable manner, as by the four posts 32, and I preferably provide a diaphragm 33 with a circular aperture just large enough to accommodate the fan blades, so that the fan will draw a steady current of air through the inlet pipe and not be impeded by any eddy currents that might be set up in the portion of the passage not directly reached by the blades. To guide the fan frame as it is raised from the full-line position of Fig. 2 to the dotted-line position, I provide suitable means, such as the four posts 34, which, by coöperating with the recesses 35 in the corners of the base 30 and the top piece 31, serve as guides for the fan-supporting frame when it is raised by the cable or chain 36. I preferably arrange that the fan may be operated from the first floor, and, for this purpose, I provide the casing 37, which may be secured at a convenient point above the fan, such as upon the wall 14. This casing 37 is provided with a shaft 38 journaled therein, having the operating handle 39 secured on the outer end thereof and adapted to be swung anti-clockwise from the position shown in Fig. 4, in which the fan is in position, to a position 270 degrees therefrom in which the fan is out of use. The pointer 40 may be attached to the shaft to indicate the position of the fan. The cable 36 is attached at its upper end to the sheave 41 secured on the shaft 38, so that when the shaft is rotated through the two hundred and seventy degrees indicated, the fan will be just lifted out of the inlet passage 23, so that its base 30 will close the aperture in the top of the inlet through which the fan is lifted. To hold the fan lifted, I preferably employ a spring-pressed plunger 42 for the handle 39, and provide an aperture 43 in the front of the casing, with which the plunger 42 coöperates to lock the shaft 38, and consequently the fan, in its elevated position. When the fan is to be put into operation again, all that is necessary is to pull out the plunger 42 and allow the fan to descend.

I preferably arrange the apparatus so that the current will be thrown onto the fan automatically when it is lowered, and cut off when it is raised, and for this purpose, wires 44 leading to the fan are brought up to terminals 45 and 46 in the casing 37, and at the top of the casing are terminals 47 and 48 leading to the line wires. Upon the shaft 38 I secure an insulating disk 49, which carries on its periphery conducting strips 50 and 51, which are adapted to connect the terminals 47 and 48 and the terminals 45 and 46 when the shaft 38 is in the position for the fan to be raised, and to connect the terminals 45 and 47, and 46 and 48, when the fan is in its operative position.

While my system might be employed with any form of a furnace 52, it is decidedly better to employ it in connection with the air-tight variety illustrated in Fig. 2, in which the body is cylindrical, with the top and bottom and the floor casings firmly riveted thereto so as to make the structure absolutely air-tight with reference to the casing 16, an advantage which is not found in the ordinary cast construction. With the natural draft, there is not much chance of the gases of combustion escaping into the casing 16, but with the forced circulation shown, there is more danger of this occurring, and for this reason I prefer to employ my invention with the specific type of furnace shown.

While I prefer to locate the fan in the inlet passage, so that the air may be forced equally to all the rooms in which the registers are open, I may locate the fan in one or more of the pipes 17 and 18, as indicated at 28ª in Fig. 1.

While I have shown and described my invention as embodied in the form which I at present consider best adapted to carry out its purposes, it will be understood that it is capable of modifications, and that I do not desire to be limited in the interpretation of the following claims, except as may be necessitated by the state of the prior art.

What I claim as new, and desire to secure by Letters Patent of the United States, is:—

1. In a system of the class described, the combination with a furnace, of a casing surrounding the same, an air-inlet passage opening into the casing, a hot-air supply passage leading therefrom, a mechanical blower located in one of said passages so as to positively force cold air into the casing and discharge it therefrom into the hot-air passage, and means for withdrawing the blower from the passage without destroying the continuity of the passage.

2. In a system of the class described, the combination with a furnace, of a casing surrounding the same, an air-inlet passage opening into the casing, a hot-air supply passage leading therefrom, a mechanical blower located in one of said passages so as to positively force cold air into the casing and discharge it therefrom into the hot-air passage, and means for withdrawing the blower from the passage without destroying the continuity of the passage and simultaneously stopping its motion.

3. In a system of the class described, the combination with a furnace, of a casing surrounding the same, an air-inlet passage opening into the casing, a hot-air supply passage leading therefrom, a mechanical blower located in one of said passages so as to positively force cold air into the casing and discharge it therefrom into the hot-air passage, means for withdrawing the blower from the passage without destroying the continuity of the passage, and connections for operating said means from a distant part of the house.

4. In a system of the class described, the combination with a furnace, of a casing surrounding the same, an air-inlet passage opening into the casing, a hot-air supply passage leading therefrom, an electric fan located in one of said passages so as to positively draw cold air into the casing and discharge it therefrom into the hot-air passage, and means for withdrawing the fan from the passage and simultaneously switching off the current from the fan motor.

5. In a heating system, a hot air furnace provided with an air intake pipe having an opening formed in one of its walls, a removable frame arranged inside of the pipe, a fan carried by the frame, the frame being provided with means for closing the opening when the fan is within the pipe, and said heating system being provided with means for closing the opening when the frame is moved to carry the fan from the interior of the pipe.

6. A hot air furnace provided with an air intake pipe having an opening formed in the upper side thereof, a frame arranged inside of said pipe and provided at its upper end with a plate that closes said opening, and an electric fan carried by said frame; substantially as described.

7. A hot air furnace provided with an air intake pipe having an opening formed in one of its walls, a frame arranged inside of said pipe provided with a plate that closes said opening, and an electric fan carried by said frame; substantially as described.

In witness whereof, I have hereunto set my hand and affixed my seal, this 14th day of February, A. D. 1907.

THOMAS E. HUNT. [L. S.]

Witnesses:
JOHN H. McELROY,
M. S. REEDER.